United States Patent [19]
Isaacson et al.

[11] 3,842,241

[45] Oct. 15, 1974

[54] ELECTRICALLY HEATED AQUARIUM TANK

[75] Inventors: Louis Isaacson, Lexington; Richard Herrin, Framingham, both of Mass.

[73] Assignee: Biozonics Corporation, Canton, Mass.

[22] Filed: Feb. 9, 1973

[21] Appl. No.: 330,987

[52] U.S. Cl. .................. 219/311, 119/5, 219/331, 219/345, 219/438, 219/526, 219/535, 219/536
[51] Int. Cl. ..................... A01k 63/00, H05b 3/20
[58] Field of Search .......... 219/345, 342, 526, 528, 219/536, 205, 311, 310, 312, 328, 331, 535, 436, 438, 464, 521, 385; 119/5

[56] References Cited
UNITED STATES PATENTS

| | | | |
|---|---|---|---|
| 2,002,380 | 5/1935 | Wermicke et al. | 119/5 X |
| 2,056,941 | 10/1936 | Krichton | 219/331 |
| 2,418,557 | 4/1947 | Reiser | 219/535 X |
| 2,459,816 | 1/1949 | Handley | 219/526 X |
| 2,491,266 | 12/1949 | Hooper | 219/311 |
| 2,677,040 | 4/1954 | Byron | 219/205 |
| 2,799,764 | 7/1957 | Chandler | 219/345 |
| 2,805,313 | 9/1957 | Lumb | 219/311 |
| 3,141,090 | 7/1964 | Batcher | 219/438 |
| 3,156,813 | 11/1964 | Trainor | 219/526 |
| 3,564,199 | 2/1971 | Blaha | 219/311 |
| 3,591,753 | 7/1971 | Gartner | 219/464 |
| 3,597,586 | 8/1971 | Rebovich | 219/219 |

*Primary Examiner*—A. Bartis

[57] ABSTRACT

An aquarium tank has a transparent nonmetallic wall to the exterior of which is adhesively secured in heat exchange relationship a thin plate like heater controlled by a temperature control having means for sensing water temperature in the tank. The heater includes a relatively thin multi-layer structure made up of (1) a flat heating element comprising a resistance element encapsulated in a non-metallic sheet (2) a thermal insulating board and (3) a heat reflective layer. A relatively thin rigid holder of plastic material is also provided and is formed with a cavity. The heating element, insulating board and reflective layer are assembled in a sandwich construction and fit in the cavity with the heating element contacting the outer surface of the tank wall when the holder is adhesively secured to the wall by a double-sided adhesive tape. A relatively thin rigid holder is also provided and is formed with a cavity. The parts of the heater are assembled in a sandwich construction and fit in the cavity with the heating element contacting the outer surface of the aquarium tank.

2 Claims, 3 Drawing Figures

3,842,241

ELECTRICALLY HEATED AQUARIUM TANK

BACKGROUND OF THE INVENTION

The present invention relates in general to a heater for use with an aquarium tank and more particularly to an aquarium tank heater that is disposed outside of the aquarium tank and secured to an outer surface thereof.

The typical heater for an aquarium tank is mounted inside the tank and the principal components of the heater are submerged in the water in the tank. Because these heaters are electrically operated there is therefore the danger of producing an electrical shock in the tank water if any part of the heater malfunctions. These in-tank heaters also usually include glass tubing which is susceptible to breakage or cracking. In addition, these known heaters because they are disposed within the tank, are readily visible and detract from the overall aesthetic appearance of the tank.

Accordingly, it is an object of the present invention to provide an improved aquarium heater that is disposed outside of the aquarium tank preferably secured to an outer surface thereof.

Another object of the present invention is to provide an aquarium heater that is preferably mounted on the side of the aquarium tank and that is relatively thin in construction. Because the heater is mounted on the outside of the tank, it is not visible when viewed through the front of the tank and because the heater is relatively thin it is also more aesthetically appealing when in view.

Still another object of the present invention is to provide an aquarium heater that is provided with a relatively large heating surface area and that is yet relatively thin.

Another object of the present invention is to provide an aquarium heater that may be placed under the tank affixed to a bottom surface thereof in those tanks that have legs or the like for elevating the tank above its rest surface.

A further object of the present invention is to overcome at least some of the problems associated with the prior art devices referred to hereinbefore.

SUMMARY OF THE INVENTION

To accomplish the foregoing and other objects of the invention the aquarium tank heater generally comprises a flat heating element that may be either a conductive sheet or a looped NICHROME wire, for example, a layer of material disposed adjacent to the flat heating element that is thermally insulating and heat reflecting, and means for holding the element and layer with the heating element exposed to an outer surface of the tank. A temperature controller is coupled to the heating element and including means for sensing the temperature of the water in the tank for, in turn, controlling the current delivered to the heating element. The heating element and layer are preferably contained in a plastic housing having a flanged outer perimeter that is secured directly to the outer surface of the aquarium tank preferably at the side of the tank.

BRIEF DESCRIPTION OF THE DRAWINGS

Numerous other objects, features and advantages of the invention will now become apparent upon a reading of the following detailed description taken in conjunction with the accompanying drawings in which.

DETAILED DESCRIPTION

Figure 1:
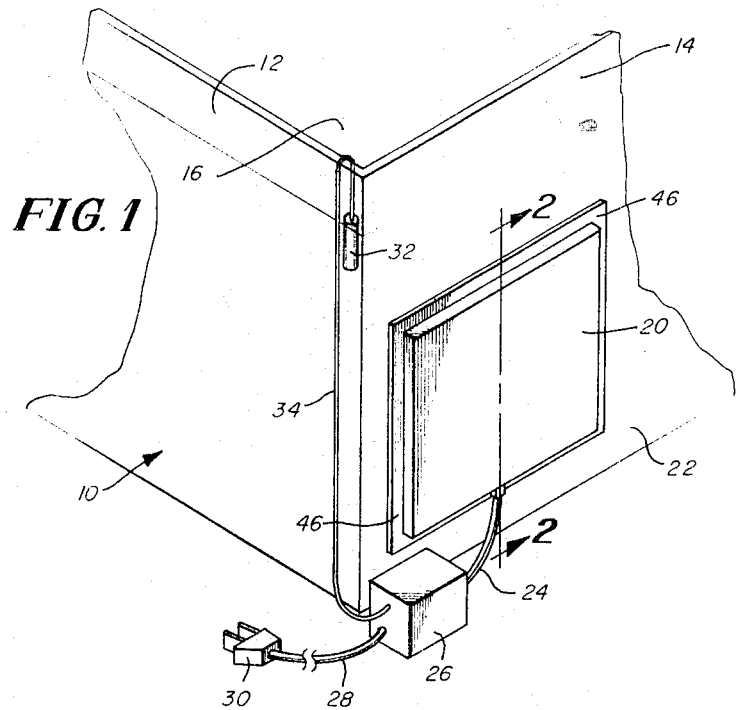
FIG. 1 is a perspective view of the aquarium heater of the present invention secured to the side of the aquarium tank.

Referring now to the drawings and in particular to the perspective view of FIG. 1, there is shown an aquarium tank 10 having a front wall 12 and a side wall 14. The tank is filled with a liquid such as water 16. In FIG. 1 the aquarium heater 20 of this invention is secured to an outer surface 22 of sidewall 14.

The aquarium heater 20 includes a heating element not shown in FIG. 1 having a current supply cord 24 coupled thereto from temperature controller 26. The temperature control receives its power by way of line cord 28 and plug 30 which may be inserted in a conventional 110 VAC outlet. Temperature control 26 also receives a temperature reading from a sensor 32 by way of conductive line 34 which couples from the sensor to an input of temperature controller 26.

The temperature controller 26 is of conventional design. One temperature controller that worked successfully was a zero-voltage switch manufactured by RCA. Obviously there are many different makes of controllers that can be used with the heater of this invention.

Figure 2:
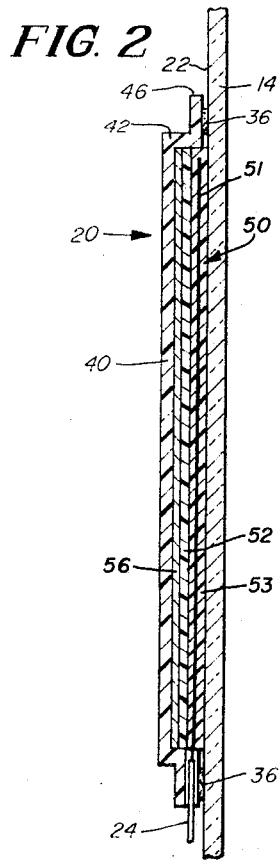
FIG. 2 is a cross-sectional view taken along line 2—2 of FIG. 1 showing the components that comprise the aquarium heater of this invention in an assembled condition.
Figure 3:
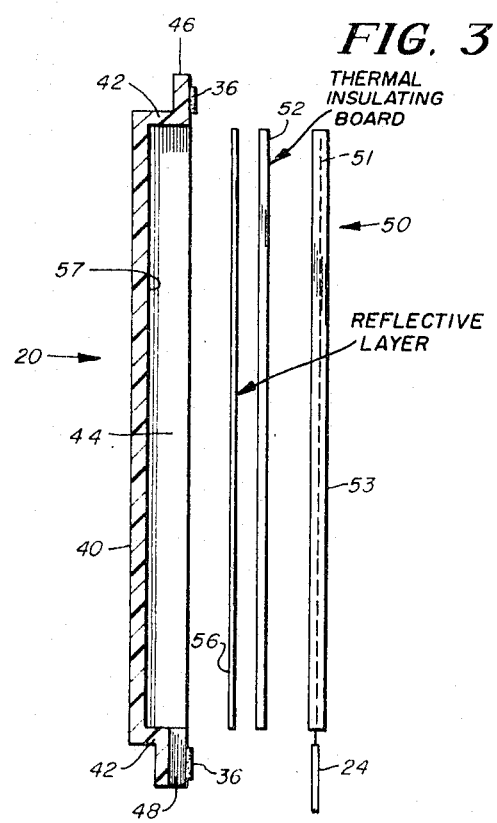
FIG. 3 is a view similar to that shown in FIG. 2 with the components of the aquarium heater exploded, one from the other.

Referring now to FIGS. 2 and 3, there is shown the aquarium heater 20 depicted in FIG. 1 assembled and disassembled, respectively. The heater has a relatively thin square shape and is affixed to surface 22 of wall 14 by means of a two-sided adhesive tape 36.

The aquarium heater includes a holder 40 which may be in the form of a picture frame holder and constructed of plastic. The holder 40 includes a peremetrical edge 42 defining a box-shaped cavity 44 and peremetrical flange 46. A passage 48 is provided at one point along flange 46 for accommodating electrical line cord 24 shown also in FIG. 1. The previously mentioned adhesive 36 is affixed between a surface of flange 46 and surface 22 of wall 14 about the perimeter of the holder.

The aquarium heater also comprises a heater element 50, thermal insulating board 52 and reflector layer 56, all of which are contained within cavity 44 of holder 40. The heater element 50 includes a conductive element 51 which may be in the form of a thin metal sheet or a loop of NICHROME wire. This conductive element is encapsulated by silicone rubber sheet 53 which is preferably smooth on its outer surface to provide good contact with board 52. The line cord 24 attaches in a suitable manner to the heating element 51 and passes through passage 48 in the holder. If a NICHROME heating wire is used, for example, the two wires of cord 24 connect to opposite ends of the NI-CHROME wire.

The thermal insulating board 52 may be constructed of fibreglass. A conventional glue is used to bond the board 52 to the heating element 50. The reflective layer 56 provides good reflectivity of the heat generated from heating element 50 away from the picture holder 40 toward the tank surface. Layer 56 may also be glued to board 52 by a conventional glue. A two-sided adhesive tape may also be used for securing the assembled layer 56, board 52 and element 50 to the inside surface 57 of holder 40. When this is accomplished the heater is in a form shown in FIG. 2 and the adhesive 36 secures the heater to the surface 22 of a side wall of the aquarium tank shown in FIG. 1.

In one embodiment of the invention the heater was approximately three-eighths of an inch thick as viewed in FIG. 2 and had a rectangular area of approximately 5-½ by 6 inches. This heater is disposed outside of the tank diminishing the likelihood of electrical shock and there are no elements of the heater that are easily broken or crushed. Also, the heater is not visible when a person is viewing in through the front wall 12 of the tank if the Brewster angle is not exceeded.

Having described one embodiment of the invention it should now become obvious to those skilled in the art that numerous other embodiments and modifications thereof may be constructed all of which fall within the spirit and scope of the present invention. For example, it is possible to use many different types of temperature controllers with the heater of this invention. Also, it is possible to place the heater on a back wall or a bottom wall of the tank when the tank is properly constructed to receive the heater in that manner.

What is claimed is:

1. In combination, an aquarium tank that may be filled with water, having at least one nonmetallic transparent wall, a temperature controller having means for sensing water temperature in the tank, means for providing power to said temperature controller, a thin plate-heater, means for coupling heat generating power from the temperature controller to the heater, and adhesive means for affixing the heater to an outside surface of a nonmetallic wall of the tank, said heater comprising a rigid holder constructed of a plastic material and including means forming a cavity having a flat bottom surface and means defining a peripheral edge therearound, said means for affixing disposed between said edge and said outside wall surface, a thin metal reflective layer coextensive with and disposed contacting the bottom surface of said cavity, a thermal insulating board coextensive with and contacting the reflective layer and a unitary heating element coextensive in size with said board and including an electrically conductive element and an encapsulating sheet, means for securing said layer, board and surface of the heating element in a sandwich arrangement in the cavity with the heating element contacting the wall surface when the holder is fixed to the tank surface.

2. The combination of claim 1 wherein said peripheral edge is four sided and said cavity is substantially square, said means for coupling heat generating power including a two wire cord, one of said peripheral edges including a passage therethrough for receiving the cord.

* * * * *